(No Model.)

J. HALEY.
PROCESS OF AND APPARATUS FOR PRESSING GLASSWARE.

No. 343,520. Patented June 8, 1886.

Attest
W H Beebe
E T Richardson

Inventor
Jonathan Haley
By Bradford Howland
Attorney

UNITED STATES PATENT OFFICE.

JONATHAN HALEY, OF RAVENNA, OHIO, ASSIGNOR TO THE EUREKA PATENT GLASS MOLD COMPANY, OF SAME PLACE.

PROCESS OF AND APPARATUS FOR PRESSING GLASSWARE.

SPECIFICATION forming part of Letters Patent No. 343,520, dated June 8, 1886.

Application filed June 11, 1885. Serial No. 168,332. (No model.)

*To all whom it may concern:*

Be it known that I, JONATHAN HALEY, of Ravenna, Portage county, Ohio, have invented a new and useful Improvement in Process and Apparatus for Pressing Glassware, of which the following is a specification.

The main object of my invention is to retain molten glass to be pressed in such a position in the mold as to cause it to flow in different directions when subjected to the action of the plunger.

Figure 1:
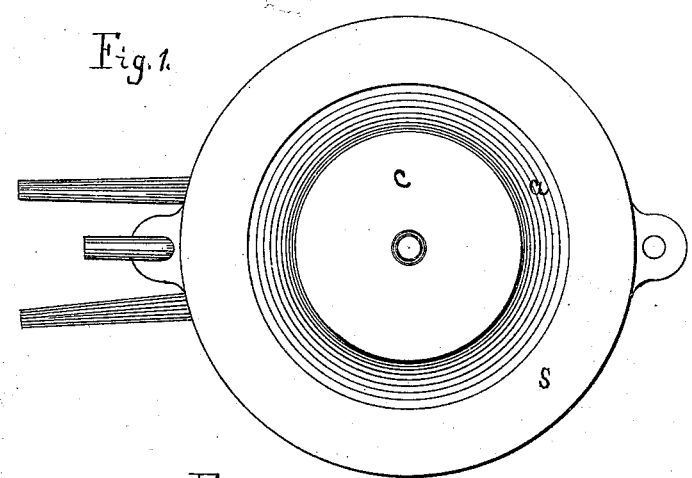
Figure 2:
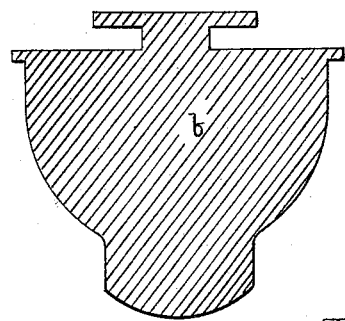
Figure 3:
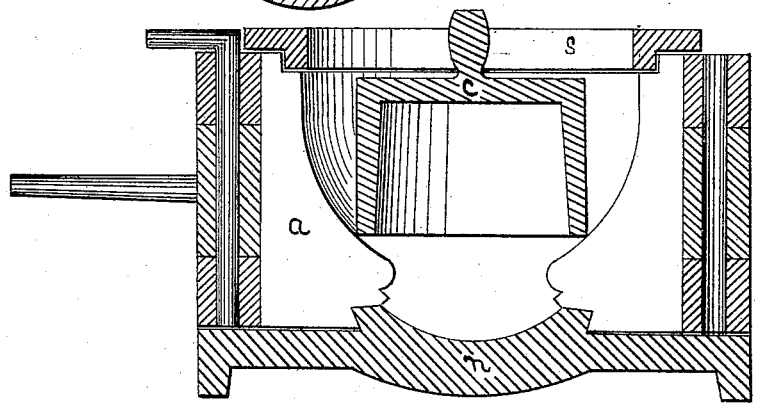

In the drawings forming a part of this specification, Figure 1 is a plan of an ordinary mold for pressing glass, with a retaining piece or guard, $c$, within it to keep the molten glass at or near the sides of the mold-cavity. Fig. 2 is a vertical section of the plunger. Fig. 3 is a vertical section of the mold $a$ and guard $c$.

The periphery of guard $c$ at its bottom is formed to fit that part of the mold-cavity with which it comes in contact, in order to prevent the molten glass when placed in the mold from flowing into the central part of the bottom of the mold-cavity.

In using guards $c$ with molds for pressing glassware with open ends, such as is described in the patent to Wm. Haley, dated January 15, 1884, No. 292,007, and in which there is a sliding plug which projects up into the mold-cavity the guard $c$ should be formed with a cavity in its bottom to receive the plug; but in ordinary molds it is not essential that the guard should be so formed, though it is preferable, because of its being lighter and more easily handled than when made solid. It is of such dimensions as to leave a sufficient space between its periphery and the sides of the mold-cavity to permit melted glass to be placed around it.

The drawings represent a hinge-mold having a bottom plate, $n$, and a top ring, $s$.

The process of pressing glassware by the apparatus herein set forth is as follows: First, placing guard $c$ in the mold-cavity; second, putting the molten glass in the space around the guard and between its periphery and the sides of the mold-cavity; third, removing guard $c$ from the mold; fourth, forcing down the plunger $b$ and pressing the glass.

In molds for pressing glass shades, as shown in the drawings, the sides of the mold-cavity being somewhat steep, the molten glass should be placed entirely around guard $c$, thus forming a ring, in order to prevent the glass from flowing down into the bottom of the mold-cavity on removing the guard and before the plunger has descended.

In using molds in which the bottom of the space around the guard $c$ is level, or nearly so, it is not essential, though preferable, that the melted glass should be put entirely around the guard.

In forming pressed glassware by the process herein described the liability of the glass to crizzle is in a great measure, if not entirely, obviated. It is especially advantageous in pressing glass shades, as they can be pressed much thinner and lighter than in the ordinary way by reason of the glass flowing both up and down while under pressure.

I claim as my invention—

1. A mold for pressing glassware provided with a guard formed at the lower part of its periphery to fit the mold-cavity, and leaving a space between its periphery and the sides of the mold-cavity to receive the molten glass to be pressed, substantially as described.

2. A mold for pressing glassware provided with a guard formed with a cavity in its bottom and having the lower part of its periphery fitted to the mold-cavity, leaving a space between its periphery and the sides of the mold-cavity to receive the molten glass to be pressed, substantially as described.

3. The process of pressing glassware, consisting of the following steps: first, placing guard $c$ in the mold-cavity; second, putting the molten glass in the space around the guard and between its periphery and the sides of the mold-cavity; third, removing the guard from the mold; fourth, forcing down the plunger and pressing the glass, substantially as described.

JONATHAN HALEY.

Witnesses:
BRADFORD HOWLAND,
H. D. SEYMOUR.